United States Patent
Abu Qahouq et al.

(10) Patent No.: US 7,652,459 B2
(45) Date of Patent: Jan. 26, 2010

(54) ADAPTIVE CONTROLLER WITH MODE TRACKING AND PARAMETRIC ESTIMATION FOR DIGITAL POWER CONVERTERS

(75) Inventors: Jaber Abu Qahouq, Beaverton, OR (US); Lilly Huang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 11/710,101

(22) Filed: Feb. 23, 2007

(65) Prior Publication Data
US 2008/0203992 A1 Aug. 28, 2008

(51) Int. Cl.
G05F 1/40 (2006.01)

(52) U.S. Cl. .................................................... 323/283
(58) Field of Classification Search ................. 323/265, 323/266, 273, 274, 282, 283, 284, 351
See application file for complete search history.

(56) References Cited

U.S. PATENT DOCUMENTS

| | | | |
|---|---|---|---|
| 7,009,372 B2* | 3/2006 | Sutardja et al. | 323/283 |
| 7,045,992 B1* | 5/2006 | Silva et al. | 323/222 |
| 7,245,113 B2* | 7/2007 | Chen et al. | 323/271 |
| 7,353,122 B2* | 4/2008 | Kernahan et al. | 702/64 |
| 2002/0167354 A1* | 11/2002 | Stanley | 330/10 |

OTHER PUBLICATIONS

Jaber A. Abu Qahouq et al., "Highly Efficient VRM For Wide Load Range with Dynamic Non-Uniform Current Sharing*", Intel Corporation, Corporate Technology Group—Systems Technology Lab, 2006, 7 pages.

Jaber A. Abu Qahouq et al., "Novel Current Sharing Schemes for Multiphase Converters with Digital Controller Implementation*", Intel Corporation, Corporate Technology Group—Systems Technology Lab, 2006, 9 pages.

* cited by examiner

*Primary Examiner*—Adolf Berhane
(74) *Attorney, Agent, or Firm*—Blakely, Sokoloff, Taylor & Zafman LLP

(57) ABSTRACT

A controller for a power stage may adaptively control power switches to improve the efficiency of power consumption by the power stage and detect continuous conduction mode ("CCM") and discontinuous conduction mode ("DCM") operations of the power stage without instantaneous or cycle by cycle sensing and sampling of the output inductor current. Additionally, the controller may be used to facilitate the estimation of output inductor value, the peak inductor current value, and other information on converter operations.

21 Claims, 7 Drawing Sheets

ADAPTIVE CONTROLLER WITH MODE TRACKING AND PARAMETRIC ESTIMATION FOR DIGITAL POWER CONVERTERS

BACKGROUND

1. Field

This disclosure relates generally to power delivery technologies in an electronic system, and more specifically but not exclusively, to controllers for power converters in an electronic system.

2. Description

As Integrated Circuits ("ICs") (e.g., Digital Signal Processors ("DSPs")) Circuits) in a computing platform become more power efficient, it is naturally desirable that a voltage regulator ("VR") or a power delivery subsystem for such ICs becomes more energy efficient during power conversion at all load levels including light loads. Variable switching frequency combined with Discontinuous Conduction Mode (DCM) is used to improve converter efficiency at light loads. Such schemes may result in improved light load efficiency with no impact on high load efficiency but sometimes at the expense of degraded performance in terms of steady-state voltage ripple and dynamics. Other schemes such as non-linear control schemes are also proposed to meet the demand on performances while improving light load efficiency, but require additional detection of the peak inductor current in DCM.

Typically, a digital controller is used to control power delivery subsystem and to interface with ICs and other components in a digital system. A digital controller has advantages for being flexible and generally resulting in higher power conversion efficiency at all loads levels than an analog controller. For a typical digital controller to perform well, however, it requires the detection of DCM which further requires sensing the output inductor current and detecting the zero-crossing point of the output inductor current. To accurately detect the zero-crossing point of the output inductor current, the output inductor current needs to be sampled at a high sampling rate, to be converted to the digital form, and to be compared with zero. This means high speed sampling, high resolution analog-to-digital conversion ("ADC"), and high speed comparison are required. All of these result in an increase in power consumption, and in the size and cost of the power delivery subsystem and the entire system. Moreover, the switching noise, which is introduced at instances of turning on and off of the converter switches (when the zero crossing and peak of inductor current occurs), makes it more difficult to detect the zero-crossing point of the output inductor current. Furthermore, the addition of the sensing circuit for the output inductor current may impact the accuracy of the sensed and sampled values of the output inductor current and may in turn impact the operation accuracy of the digital power converter.

BRIEF DESCRIPTION OF THE DRAWINGS

The features and advantages of the disclosed subject matter will become apparent from the following detailed description of the subject matter in which.

DETAILED DESCRIPTION

According to embodiments of the subject matter disclosed in this application, a digital controller for a power converter may adaptively control power switches and detect continuous conduction mode ("CCM") and discontinuous conduction mode ("DCM") operations of the power converter without instantaneous or cycle by cycle sensing and sampling of the output inductor current. This may result in savings of power consumption by and the size and cost of a power converter in an electronic system. Additionally, the digital controller may be used to facilitate the estimation of output inductor value, the peak inductor current value, and other information on converter operations based in part on the input current obtained via low speed sensing.

Reference in the specification to "one embodiment" or "an embodiment" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

Figure 1:
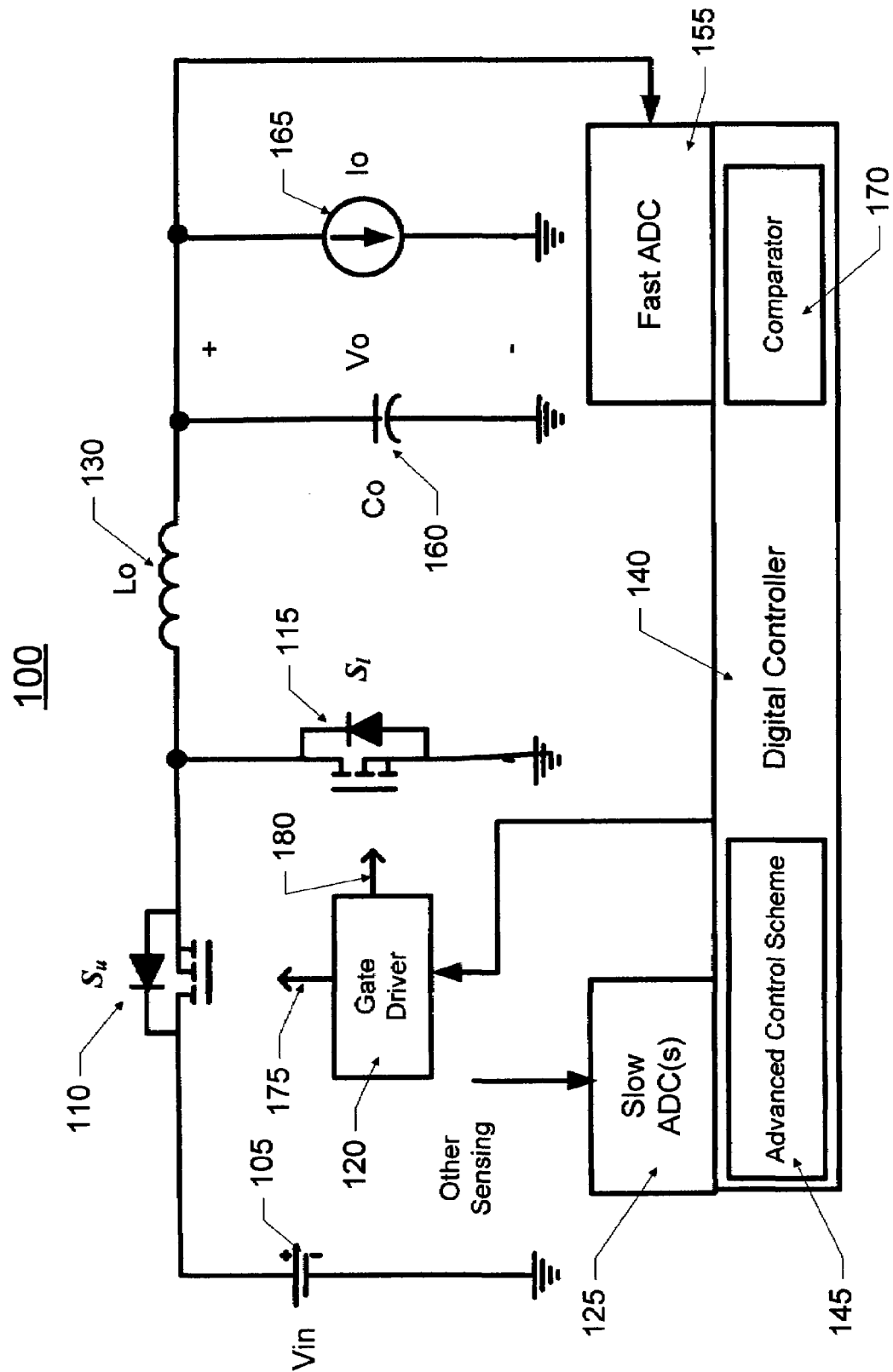
FIG. 1 illustrates a diagram of a power converter with a digital controller.

FIG. 1 illustrates a diagram of a power converter 100 with a digital controller 140. Power converter 100 includes a control power switch 110, a synchronous power switch 115, a gate driver 120 to power switches 110 and 115, an output inductor 130, an output capacitor 160 of the power converter 100, a load 165 of the power converter, and an input power source 105 which supplies input voltage and/or power to the power converter. When control power switch 110 is turned on, the input power source 105 forces current into output inductor 130 and charges output capacitor 160. When the current in output inductor reaches its high peak, control power switch 110 is turned off and synchronous power switch 115 is turned on to provide a closed path for the output inductor current to flow. When the output inductor current decreases to its lower peak, synchronous power switch 115 is turned off and control power switch 110 is turned on. In most applications, the output inductor current never drops to zero at during full-load operation (this is defined as continuous conduction mode ("CCM") operation). Overall performance is usually better using CCM, and it allows maximum output power to be obtained from a given input voltage and switch current rating.

Figure 3A:
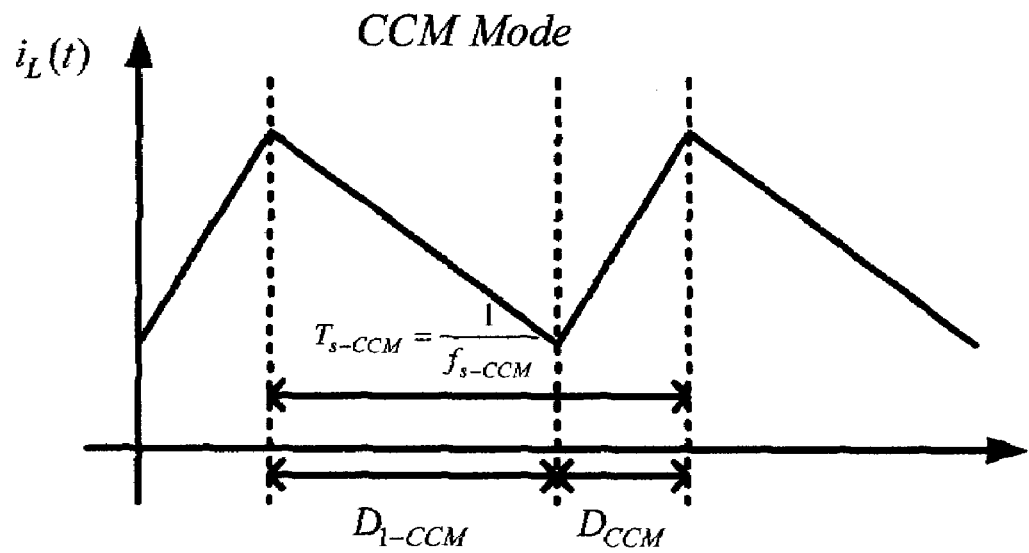
FIGS. 3A and 3B illustrate the output inductor current waveforms of power converter 200 (as shown in FIG. 2) operated in continuous conduction mode ("CCM") and in discontinuous conduction mode ("DCM"), respectively.
Figure 3B:
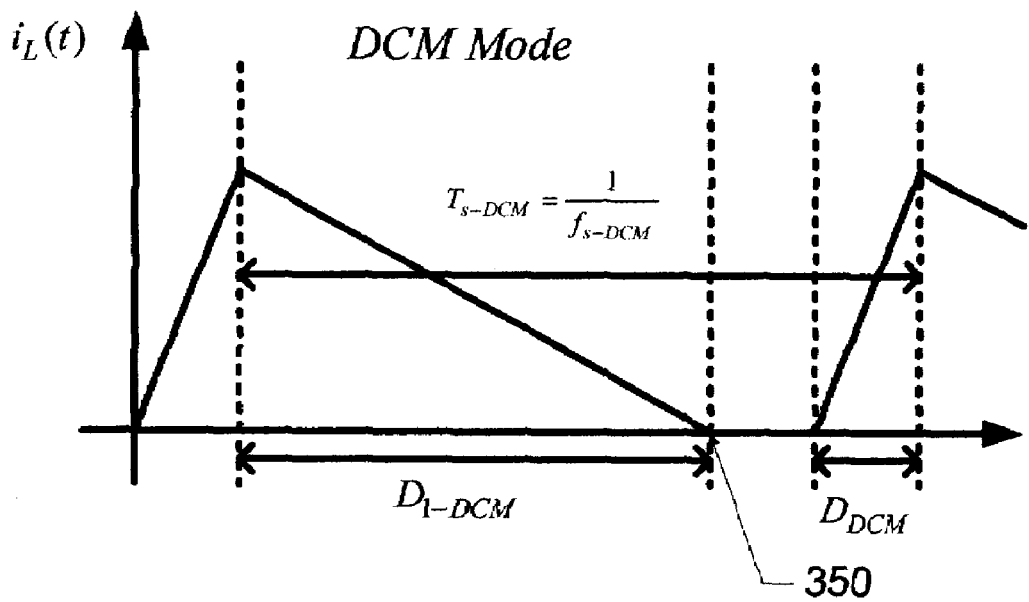

In applications where the maximum load current is fairly low, the output inductor current may drop to zero. When this happens, it can be advantageous to operate the power converter 100 in a design for discontinuous conduction mode ("DCM"), that is, when the output inductor current drops to zero, synchronous power switch 115 is turned off to prevent the output inductor current drops below zero before control power switch 110 is turned on again. Operating in discontinuous mode may result in a smaller overall converter size because a smaller inductor may be used. Operating at DCM at lower load current values is generally harmless and even converters designed for CCM operations at full load will become discontinuous as the load current is decreased. FIGS. 3A and 3B show waveforms of the output inductor current, $i_L$, in CCM and DCM, respectively.

Additionally, the power converter 100 includes a digital controller 140, a fast analog-to-digital converter ("ADC") 155, one or more slow ADC 125, and a gate driver 120. Digital controller 140 may include an advanced control scheme unit 145, a comparator 170, and some other components. Although not shown in the figure, the power converter 100 also includes a sensing component to sense the output inductor current and feed the sensed inductor current to fast ADC 155, and other sensing components to sense other data such as the input current. Fast ADC 155 converts the sensed inductor current from analog to digital form. The digitized inductor current may be first amplified/compensated before it is provided to comparator 170 in digital controller 140. The comparator 170 compares the digitized inductor current with zero to detect the zero-crossing point of the inductor current. To improve the accuracy of the zero-crossing detection, it is desirable that ADC 155 be fast with high resolution and that comparator 170 also be fast. Slow ADC 125 may convert other sensed data such as input current from analog form to digital form and provides the digitized data to digital controller 140.

Figure 6:
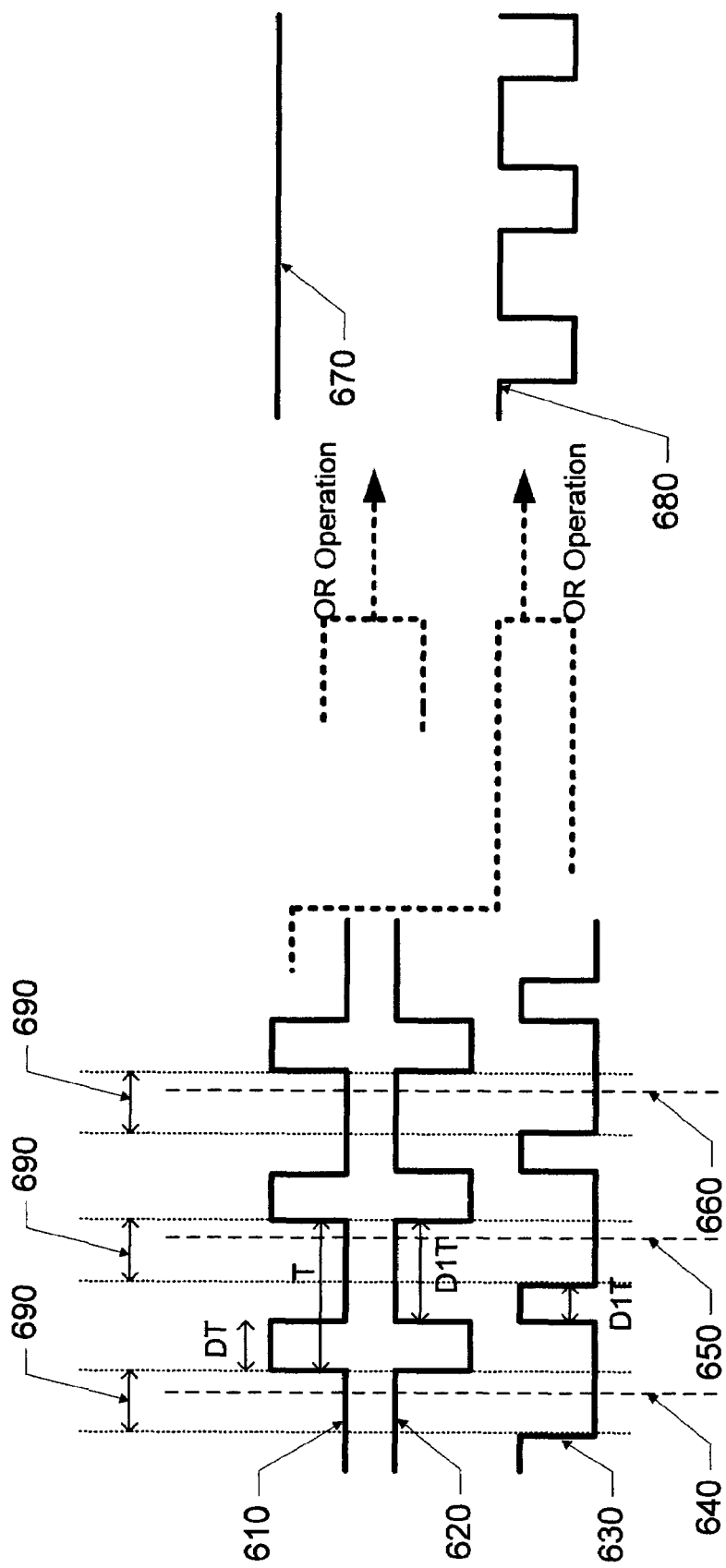
FIG. 6 is a schematic illustrating a method for determining the operation mode of a power converter, according to an embodiment of the subject matter disclosed in the present application.

Digital controller 140 receives digitized data such as input current and output inductor current, process such data, and based on the processed results determines through advanced control scheme unit 145 what control signal it should send to gate driver 120. Based on the control signal received from the digital controller, gate driver 120 generates a control signal 175 for control power switch 110 and a control signal 180 for synchronous power switch 115. When the power converter operates in CCM, control signal 175 and control signal 180 may be complementary to each other, i.e., when control signal 175 is high (i.e., control power switch 110 is turned on), control signal 180 is low (i.e., switch 115 is turned off); and when control signal 175 is low (switch 110 is turned off), control signal 180 is high (switch 115 is turned on). When the power converter operates in DCM, the switching frequency of control signal 175 may remains the same or similar to that under CCM; but the switching frequency of control signal 180 will vary. Under DCM, digital controller detects the point where the output inductor current is crossing zero and turns control signal 180 to low through gate driver 120 even though control signal 175 still remains low. Example waveforms of control signal 175 and control signal 180 are shown in FIG. 6 where waveform 610 illustrates control signal 175 under both CCM and DCM; waveform 620 illustrates control signal 180 under CCM; and waveform 630 illustrates control signal 180 under DCM.

For power converter 100 to operate in DCM properly, ADC 155 needs to be fast with high resolution, and comparator 170 needs to be fast also. For example, for a power converter operating at 500 kHz, a sensing component for the output inductor current with a bandwidth of larger than 10 MHz is necessary to maintain a proper operation (sensing of actual and not distorted inductor current signal). If this signal is instantaneously sampled cycle by cycle, an ADC of 12-bit with 5M samples/second or higher resolution is necessary. Such circuits will provide the controller with information such as peak current and zero crossing/mode information at the expense of increase of power consumption, cost, size, and design complexity. In addition, the inductor value in a power converter cannot be measured or calculated without additional circuitry.

Figure 2:
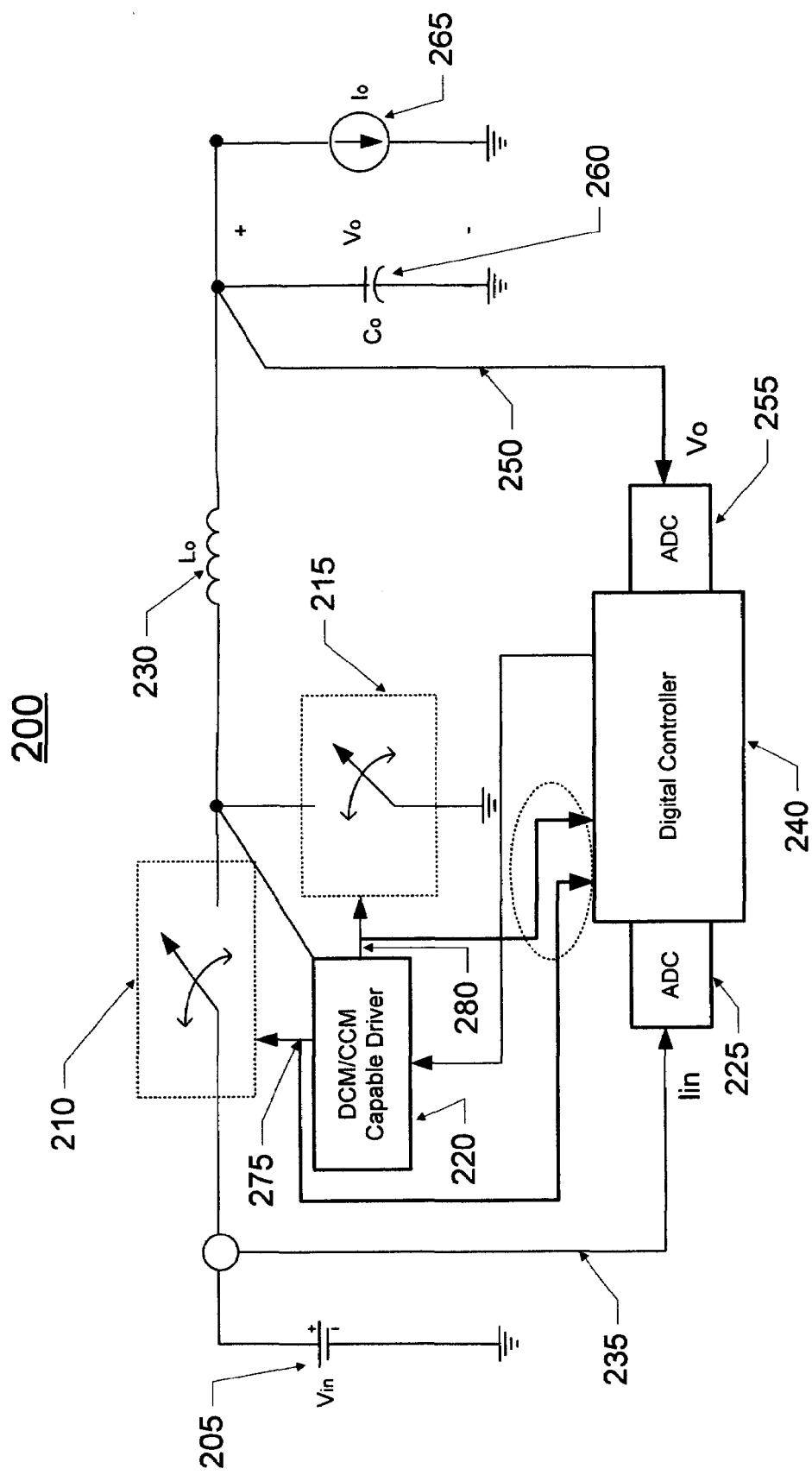
FIG. 2 illustrates a diagram of a power converter with a digital controller, according to an embodiment of the subject matter disclosed in the present application.

FIG. 2 illustrates a diagram of a power converter 200 with a digital controller 240, according to an embodiment of the subject matter disclosed in the present application. Power converter 200 includes a control power switch 210, a synchronous power switch 215, a DCM/CCM capable driver 220 for power switches 210 and 215, an output inductor 230, an output capacitor 260 of the power converter 200, a load 265 of the power converter, and an input power source 205 which supplies input voltage and/or power to the power converter. These components of power converter 200 correspond to those components in power converter 100 shown in FIG. 1 (e.g., DCM/CCM capable driver 220 corresponds to gate driver 120 in FIG. 1).

Figure 4:
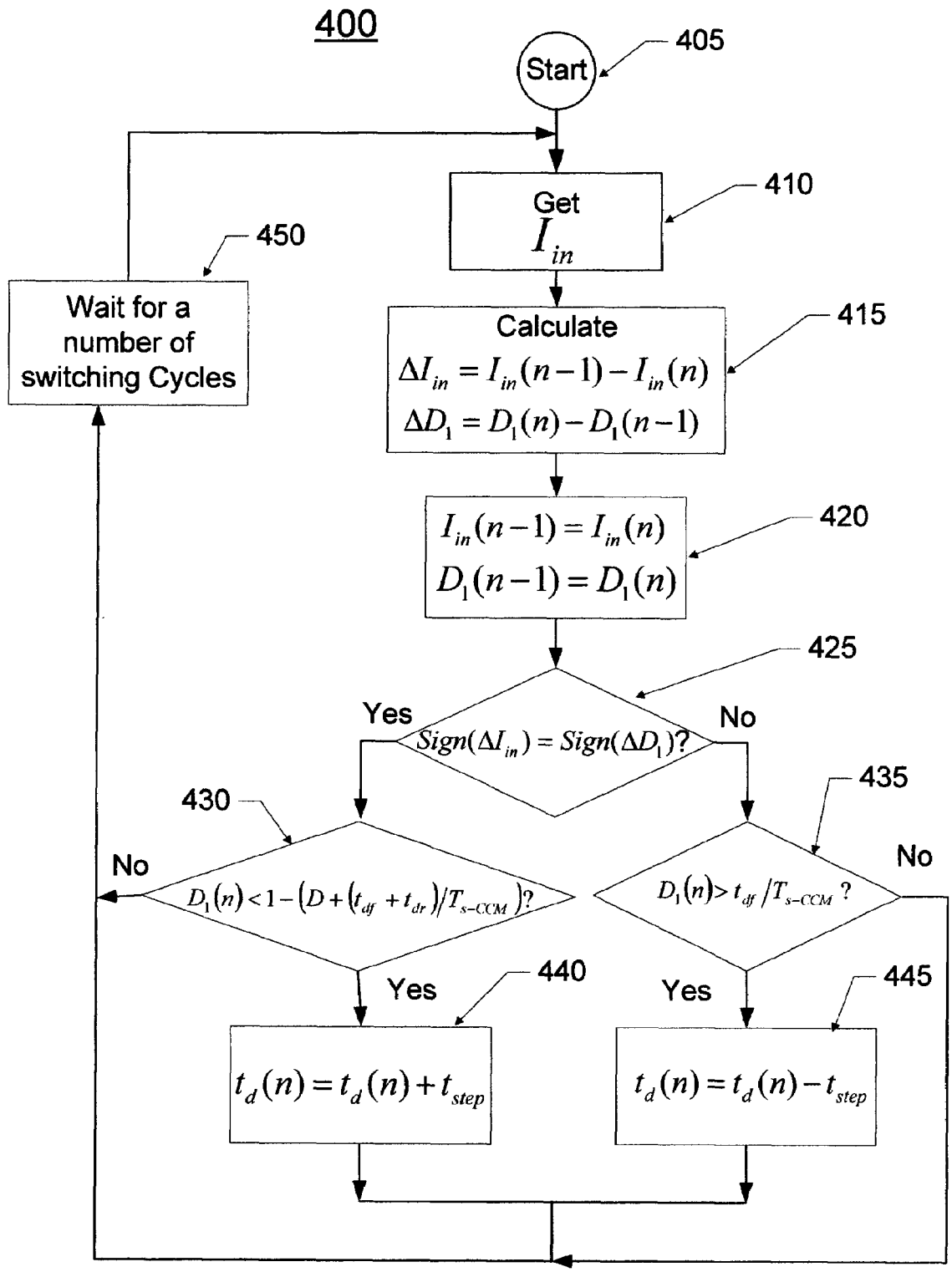
FIG. 4 is a flowchart of one example process for adaptively control power switches without sensing the output inductor current, according to an embodiment of the subject matter disclosed in the present application.
Figure 5:
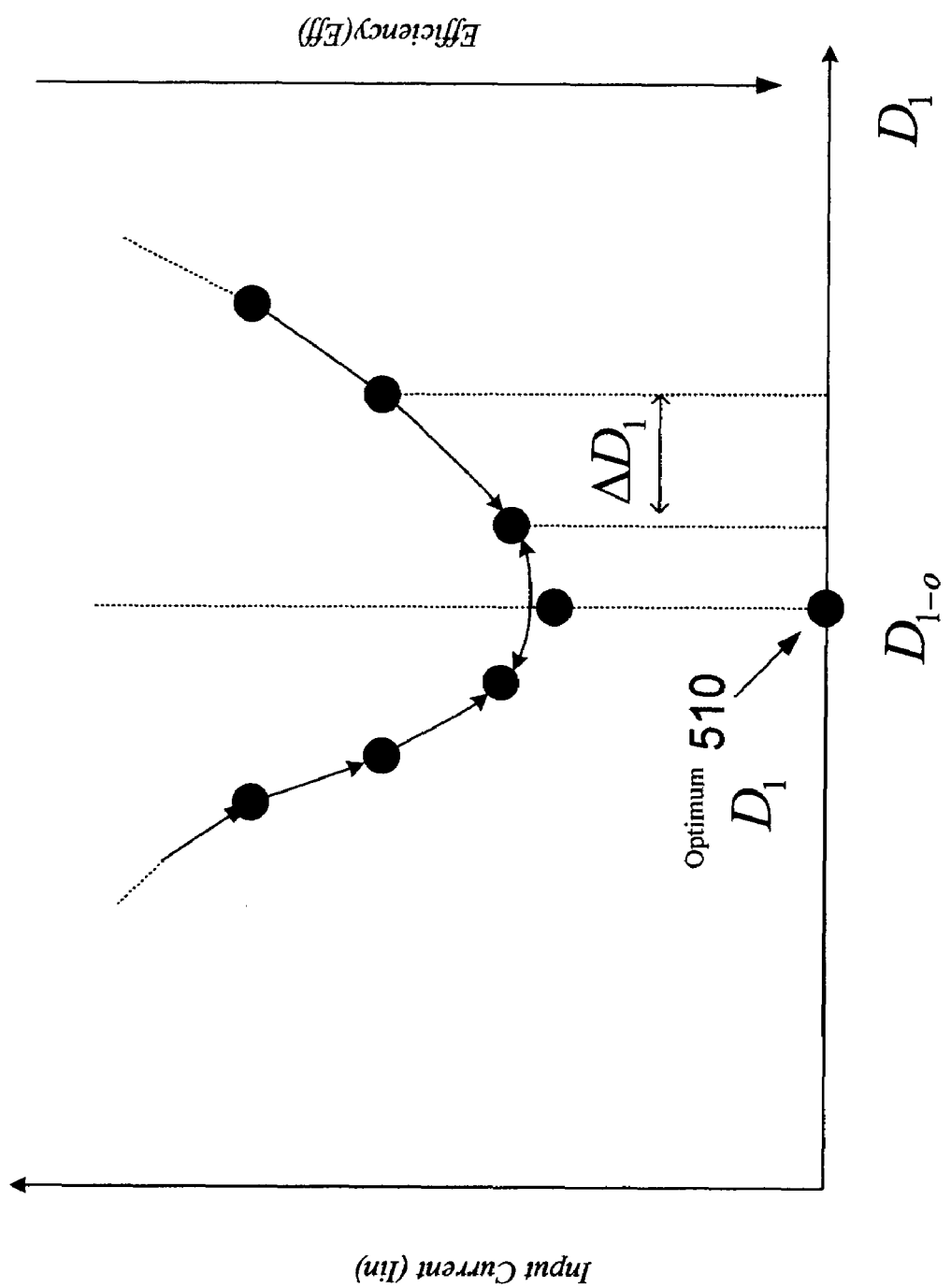
FIG. 5 illustrates the relationship between the duty cycle of the lower switch in a digital power converter and the zero-crossing of the output inductor current.

Differences between power converter 200 and power converter 100 include but not limited to 1) there is no sensing of output inductor current in power converter 200; 2) no high speed/high resolution ADC is required in power converter 200; 3) there is no high speed comparator is necessary in power converter 200; and 4) no need to detect peaks of output inductor current in power converter 200. The only sensed information in addition to the output voltage 250 for regulation is the average input current 235. Neither the output voltage 250 nor the average input current 235 requires high-speed sensing or high speed/high resolution ADC. Based on the digitized output voltage and the digitized average input current, digital controller 240 of power converter 200 detects the zero-crossing point of the output inductor current using an advanced control scheme as illustrated in FIGS. 4 and 5; and generates a control signal to DCM/CCM capable driver 220 accordingly. DCM/CCM capable driver 220 may produce control signal 275 for control power switch 210 and control signal 280 for synchronous power switch 215. When power converter 200 operates in DCM, control signal 280 turns to low (even when control signal 275 still remains low) when the zero-crossing point of the output inductor current is detected by digital controller 240. Additionally, digital controller 240 may determine whether power converter 200 operates under CCM or DCM based on control signal 275 and control signal 280. Furthermore, digital controller 240 may be able to estimate parameters such as DCM peak inductor current, output inductor value, and critical input current.

FIGS. 3A and 3B illustrate the output inductor current waveforms of power converter 200 (as shown in FIG. 2) operated in CCM and in DCM, respectively. Since a digital controller 240 is used, the duty cycle (D) of the control power switch 210 is available with no required sensing. By utilizing the knowledge of the sensed input current $I_{in}$ and D, converter parameters may be estimated more accurately, since these two parameters are directly related to (or impacted by) the effect of power losses of a converter. The duty cycle ($D_1$) of the synchronous power switch 215 depends on the operation mode, CCM or DCM. In CCM, $D_{1\text{-}CCM} \approx 1 - D_{CCM}$; while in DCM, $D_{1\text{-}DCM}$ value depends on the inductor current zero crossing point, which is a function of many power converter design parameters. As shown in FIGS. 3A and 3B, $D_{CCM}$ stands for the duty cycle of the "on" time of the synchronous power switch in CCM; $D_{1\text{-}CCM}$ stands for the duty cycle of the "off" time of the synchronous power switch in CCM; $D_{1\text{-}DCM}$ stands for the duty cycle of the "on" time of the synchronous power switch in DCM; and $D_{DCM}$ stands for the duty cycle of the "off" time of the synchronous power switch that corresponds to the rising edge of the output inductor current. These duty cycles may be estimated using the equations below.

CCM Mode:

$$D_{CCM} \approx V_o/V_{in} \quad (1)$$

$$D_{1-CCM} \approx 1-(V_o/V_{in}) = 1-D_{CCM} \quad (2)$$

DCM Mode:

$$D_{DCM} \approx D_{1-DCM} \cdot [V_o/(V_{in} - V_o)] \quad (3)$$
$$\approx \sqrt{[(2 \cdot L_o \cdot I_o \cdot V_o \cdot f_{s-DCM})/(V_{in} \cdot (V_{in} - V_o))]}$$

$$D_{1-DCM} \approx \sqrt{[(2 \cdot L_o \cdot I_o \cdot f_{s-DCM})/(V_{in} - V_o)]} \cdot \left(\sqrt{V_{in}/V_o} - \sqrt{V_o/V_{in}}\right) \quad (4)$$

In the above equations, $V_o$ is the output voltage of the power converter; $I_o$ is the output load current; $L_o$ is the inductance of the output inductor; $f_{s-DCM}$ is the switching frequency of the synchronous power switch in DCM. In practice, in order to have more accurate value for $D_{1-CCM}$, $(t_{df}+t_{dr})/T_{s-CCM}$ may be subtracted from $D_{1-CCM}$ in Equation (2), where $t_{df}$ and $t_{dr}$ are the minimum values of falling and rising edges dead-times between the control power switch and the synchronous power switch in order to prevent the overlapping.

The duty cycle D is controlled by the closed loop feedback compensation/controller. $D_1$ varies in DCM and CCM and needs to be found. In fact, tracking $D_1$ is equivalent to detecting the zero-crossing instant 350 (as shown in FIG. 3B) of the output inductor current. FIG. 4 is a flowchart of one example process 400 for adaptively control power switches by tracking the duty cycle of the synchronous power switch operating in DCM without sensing the output inductor current, according to an embodiment of the subject matter disclosed in the present application. Based on the assumption that the optimum $D_1$ value exists which is close to the value of 1-D in CCM and close to the inductor zero crossing point in DCM, $D_1$ is varied (incremented and decremented), as illustrated in FIG. 5, until the minimum input current is achieved. When the input current is the minimum, it indicates that the minimum power is consumed. Thus the value of $D_1$ that corresponds to the minimum input current represents the optimum value of $D_1$.

Process 400 starts at block 405. At block 410, the value of the input current may be obtained from a sensing component in the power converter. At block 415, the value change of the input current, $\Delta I_{in}$, may be calculated in response to the value change of $D_1$, $\Delta D_1$ (increase or decrease), from a previous sampling point to the current sampling point. At block 420, the current sampling values of the input current and $D_1$ may be saved as their corresponding previous sampling values as the sampling process will move to the next sampling point (i.e., the next sampling point will become the current sampling point). At block 425, the sign of $\Delta I_{in}$ and the sign of $\Delta D_1$ may be compared. If they are the same, a further determination at block 430 may be performed. If the sign of $\Delta I_{in}$ and the sign of $\Delta D_1$ are not the same, a further determination at block 435 may be performed. At block 430, the current value of $D_1$ is compared with the value of $1-(D+(t_{df}+t_{dr})/T_{s-CCM})$. If the former is not less than the later, this indicated that the power converter may operate in CCM and process 400 thus moves to block 450 to wait for a number of switching cycles to start the process again. If the value of $D_1$ is less than the value of $1-(D+(t_{df}+t_{dr})/T_{s-CCM})$, it indicates that the power converter operates in DCM and the optimal point of $D_1$ has not been reached; and the sampling point of $D_1$ may move forward by one step at block 440. At block 435, current value of $D_1$ is compared with the value of $t_{df}/T_{s-CCM}$ (this may be considered as the minimum value for $D_1$). If $D_1$ is not larger than $t_{df}/T_{s-CCM}$, process 400 moves to block 450 to wait for a number of switching cycles to restart the process again. If $D_1$ is larger than $t_{df}/T_{s-CCM}$, the sampling point of $D_1$ may move backward by one step at block 445. In general, when there is more than a certain number, say two, of consecutive increment and decrement about the optimum point, process 400 may be stopped and $D_1$ can be set until an input current change occurs. The optimal value of $D_1$ may be stored along with its associated $I_{in}$ so that it can be utilized in further parameters estimation and/or be used as a starting point for the next search for the optimal $D_1$.

FIG. 5 illustrates the relationship between the duty cycle of the lower switch in a digital power converter and the zero-crossing of the output inductor current. As shown in the figure, there is one point of $D_1$ (optimum $D_1$ 510) which corresponds to the minimum value of $I_{in}$. Since the input voltage is normally fixed, the minimum $I_{in}$ corresponds to the highest power consumption efficiency. Using the relationship of $D_1$ and $I_{in}$ as shown in this figure, the optimum $D_1$ may be found according to the process as shown in FIG. 4. It should be noted that if the input voltage is not fixed, the input power rather than the input current should be used to search for the optimum $D_1$, which should corresponds to the minimum input power.

The duty cycle of control power switch (e.g., 210 in FIG. 2) and the duty cycle of synchronous power switch (e.g., 215 in FIG. 2) may be used to determine whether the current operation mode of the power converter is CCM or DCM. One way for making such a determination is as follows:

$$\begin{cases} 1-D > D_1 & \Rightarrow DCM \\ \text{Otherwise} & \Rightarrow CCM \end{cases} \quad (5)$$

Another way for making such a determination is illustrated in FIG. 6. When the power converter (e.g., 200 in FIG. 2) operates in CCM, the control signal for control power switch and the control signal for synchronous power switch are complimentary as illustrated by waveform 610 and 620 in FIG. 6 (i.e., when 610 is high, 620 is low; and vice versa). When the power converter operates in DCM, however, there is a gap (shown as 690 in FIG. 6) between the instant when synchronous power switch is turned off and the instant when control power switch is turned on (the control signal for synchronous power switch operating in DCM is illustrated by waveform 630 in FIG. 6). Thus, if an logic OR operation is performed between the control signal for control power switch and the control signal for synchronous power switch, the output will ideally be always high as illustrated by waveform 670 in CCM and will be low during the gap 690 when both the control power switch and the synchronous switch are turned off, as illustrated by waveform 680 in DCM. If the output of the OR operation is sampled at instants (e.g., 640, 650, and 660) right before the control power switch is turned on, the result should be high for CCM but low for DCM. Thus, the operation mode of the power converter may be determined by the output of the OR operation between the control signal for the control power switch and the control signal for the synchronous power switch at instants right before the control power switch is turned on.

As discussed above, according to an embodiment of the subject matter discussed in the present application, a power converter may be able to operate in an adaptive mode to switch between fixed switching frequency for the synchronous power switch in CCM and variable switching frequency for the synchronous power switch in DCM without the need of sensing the instantaneous output inductor current. In addition to such an adaptive mode switching scheme, other parameters which are useful for a power converter design and improvement may be estimated. Note that parameter estimation may be performed in conjunction with or independent of (so long as the value of $D_1$ can be obtained somehow) the adaptive mode switching scheme. As shown above, using D and $I_{in}$ (or the input power) as inputs may help tie the determination of the optimum $D_1$ with improving the efficiency of power consumption of a power converter because $I_{in}$ (or the input power) is an important factor in determining the power consumption. Similarly, parameters estimated using D and $I_{in}$ as inputs may allow more accurate parameter estimation than those estimated using the output current, output inductor current, and/or input voltage as inputs; and the resulting parameters may reflect values of those parameters under high power consumption efficiency.

One parameter that may be estimated is peak inductor current in DCM. This parameter may be used to control output voltage ripple while achieving improved efficiency. The relationship between $D_{DCM}$ (as shown in FIG. 3B) and the peak output inductor current ($i_{max-DCM}$) is as follows, $$i_{max-DCM} \cong \frac{2 \cdot I_{in}}{D_{DCM}} \qquad (6a)$$

or $$D_{DCM-max-Limit} \cong \frac{2 \cdot I_{in}}{i_{max-DCM-Limit}} \qquad (6b)$$

In Equation (6b), $i_{max-DCM-limit}$ is a limit for the peak output inductor current which may be a constant or a function of the load or the input current; $D_{DCM-max-limit}$ is a $D_{DCM}$ that corresponds to $i_{max-DCM-limit}$. Based on the relationship between $D_{DCM}$ and $i_{max-DCM}$, by controlling $i_{max-DCM}$, the output voltage ripple may be controlled. For example, $i_{max-DCM}$ may be set to be $i_{max-DCM}=\sigma \cdot D_{DCM}$, where σ is a constant that determines how much inductor current is allowed.

It should be noted that there is a difference between $D_{DCM-max-Limit}$ and $D_{DCM}$ when using the proposed digital PSL (DigiPSL) with peak inductor current tracking. DigiPSL is described in "Control Scheme to Improve Converters' Efficiency and Dynamic Performance for Battery Powered Applications," by Jaber Abu-Qahouq, Lilly Huang, Osama Abdel-Rahman, and Issa Batarseh, published in the IEEE Industry Applications Society 41$^{st}$ Annual Meeting, IAS'2006, in October 2006. $D_{DCM}$ is the duty cycle value that is proportional to the closed loop compensator error signal, which may be obtained through the controller, while $D_{DCM-max-Limit}$ is the final limited duty cycle that should be at the output of the Digital Pulse Width Modulation ("DPWM") and would go to the converter switches to limit the DCM peak inductor current to $i_{max-DCM-Limit}$. $D_{DCM}$ is the value that should be used to modulate the switching frequency of the synchronous power switch which may be expressed as $f_{s-DCM}=\lambda \cdot D_{DCM}$, where λ can be simply selected to be $\lambda \approx f_{s-CCM} \cdot V_{in}/V_o$ or can be selected to be another linear, non-linear, or piecewise linear function. This approach will provide a natural controller response that eventually will set the switching frequency to a value that will result in desired output voltage regulation and ripple control. Eventually, $D_{DCM}$ and $D_{DCM-max-Limit}$ will be equal in a steady state.

Figure 7:
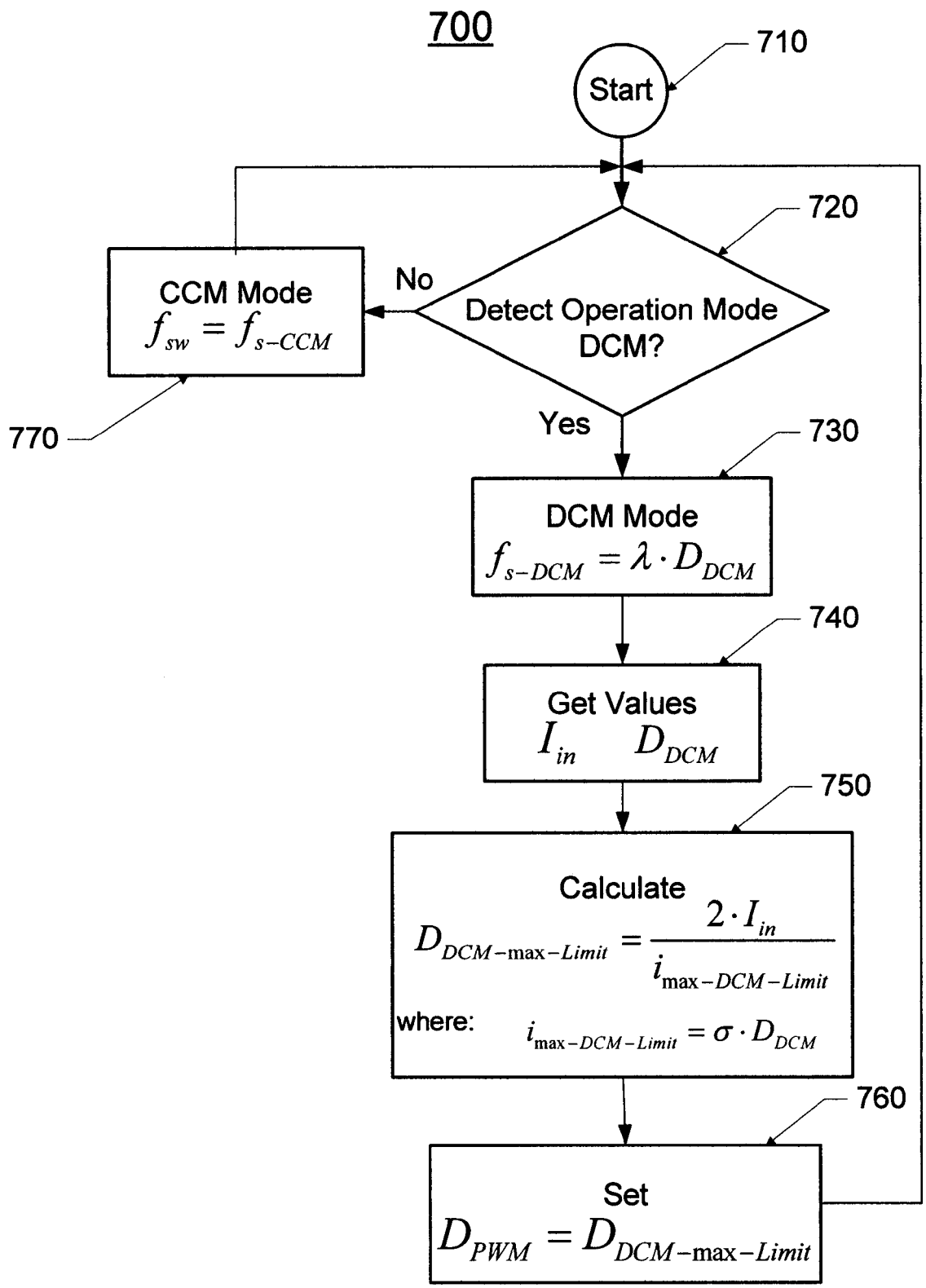
FIG. 7 is a flowchart of one example process for tracking the peak output inductor current in DCM and to control the output voltage ripple by limit the peak output inductor current in DCM.

FIG. 7 is a flowchart of one example process 700 for tracking the peak output inductor current in DCM and to control the output voltage ripple by limit the peak output inductor current in DCM. Process 700 starts at block 710. At block 720, the operation mode of the power converter is determined. It should be noted that it is not necessary to use process 400 (shown in FIG. 4) to detect the DCM operation mode. The operating mode of a power converter may still be detected by detecting the zero crossing instant of the output inductor current. If the operation mode is DCM, the switching frequency of the synchronous power switch may be set at block 730. At block 740, values of $D_{DCM}$ and $I_{in}$ may be obtained from the digital controller and from the sensing device for the input current. At block 750, $D_{DCM-max-Limit}$ may be calculated based on Equation (6b) by setting $i_{max-DCM-limit}=\sigma \cdot D_{DCM}$. At block 760, $D_{PWM}$ (duty cycle of pulse width modulation) may be set to $D_{DCM-max-Limit}$. After block 760, the process may repeat again from block 720. If the operating mode of the power converter is determined to CCM at block 720, then the switching frequency ($f_{sw}$) of the synchronous power switch may be set be equal to the switching frequency of the control power switch, $f_{s-CCM}$ at block 770 and there is no need to limit the output inductor current. Process 770 may repeat from block 720 after block 770.

Another parameter that may be estimated by a digital controller based on the duty cycle of the control power switch and the input current is output inductor value, $L_o$. When a power converter operates in DCM, it can be shown that:

$$L_o \cong \frac{D_{1-DCM} \cdot D_{DCM} \cdot V_o}{2 \cdot I_{in} \cdot f_{s-DCM}}, \qquad (7a)$$

or $$D_{1-DCM} \cong \frac{2 \cdot L_o \cdot I_{in} \cdot f_{s-DCM}}{D_{DCM} \cdot V_o}. \qquad (7b)$$

All of the data needed to calculate $L_o$ (i.e., $D_{1-DCM}$, $D_{DCM}$, $V_o$, $I_{in}$, $f_{s-DCM}$) may be obtained through the digital controller or a sensing device.

Yet another parameter that may be estimated is critical input current, $I_{in-crit.}$, which is defined as the minimum input current right before the output instantaneous inductor current crosses zero to allow DCM operation. $I_{in-crit.}$ may be obtained using the following equation:

$$I_{in-crit.} \cong \frac{V_o \cdot (1-D_{CCM}) \cdot D_{CCM}}{2 \cdot L_o \cdot f_{s-CCM}} \qquad (8)$$
$$\cong \xi \cdot (1-D_{CCM}) \cdot D_{CCM},$$

where $\xi = V_o/(2 \cdot L_o \cdot f_{s-CCM})$ is a constant at fixed and variable input voltages for a given design and does not need to be recalculated once it is determined.

Once $L_o$ is calculated using Equation (7a), the critical input current value $I_{in-crit.}$ may be calculated using Equation (8) based on the information obtained from the CCM operation. $I_{in-crit.}$ may be used as a dividing point of CCM and DCM operating modes. This provides another way to determine whether a power converter operates in CCM or DCM.

It is optional to calculate $L_o$ and $I_{in-crit.}$ only once shortly after the converter is powered up just to calibrate the controller, to eliminate the need to continue calculating $I_{in\text{-}crit.}$. This is simple if the input voltage is fixed. $I_{in\text{-}crit.}$ may be recalculated if the input voltage varies. The $\xi$ in Equation (8) is normally almost constant at different input voltages and does no need to be recalculated. Once $I_{in\text{-}crit.}$ is available, $D_{1\text{-}DCM}$ can be estimated using Equation (7b).

It should be noted that there is no need to sense $V_{in}$ values since they may be calculated from Equations (9) and (10) below:

$$V_{in-DCM} \cong \frac{V_o \cdot (D_{DCM} + D_{1-DCM})}{D_{DCM}}, \tag{9}$$

$$V_{in-CCM} \cong \frac{V_o}{D_{CCM}}. \tag{10}$$

A change of the input voltage may be detected from the change in the duty cycles.

Moreover, other parameters such as the load current in DCM ($I_{o\text{-}DCM}$), load current in CCM ($I_{o\text{-}CCM}$), $\Delta I_{L_o\text{-}CCM}$ ($=I_{L_o\text{-}max\text{-}CCM} - I_{L_o\text{-}min\text{-}CCM}$), maximum output inductor current in CCM ($I_{L_o\text{-}max\text{-}CCM}$), and minimum output inductor current in CCM ($I_{L_o\text{-}min\text{-}CCM}$) may also be obtained using the following equations:

$$I_{o-DCM} \cong \frac{I_{in} \cdot (D_{DCM} + D_{1-DCM})}{D_{DCM}}, \tag{11}$$

$$I_{o-CCM} \cong \frac{I_{in}}{D_{CCM}}, \tag{12}$$

$$\Delta I_{L_o-CCM} \cong \frac{(1 - D_{CCM}) \cdot V_o}{L_o \cdot f_{s-CCM}}, \tag{13}$$

$$I_{L_o-max-CCM} \cong \Delta I_{L-CCM} + \frac{I_{in}}{D_{CCM}}, \tag{14}$$

$$I_{L_o-min-CCM} \cong \Delta I_{L-CCM} - \frac{I_{in}}{D_{CCM}}. \tag{15}$$

Although an example embodiment of the disclosed subject matter is described with reference to block and flow diagrams in FIGS. 1-7, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method for adaptively controlling a power stage in an electronic system, comprising:
  obtaining an input power of the power stage;
  obtaining the current duty cycle of a synchronous power switch in the power stage;
  adaptively changing the duty cycle of the synchronous power switch until the minimum input power is obtained including:
    increasing or decreasing the duty cycle of the synchronous power switch;
    checking whether the input power decreases as a result of the increase or decrease of the duty cycle of the synchronous power switch;
    if the input power does not decrease as a result of the increase or decrease of the duty cycle of the synchronous power switch, determining whether the power stage operates in a continuous conduction mode ("CCM") or a discontinuous conduction mode ("DCM"); and
    if the power stage operates in CCM mode, adaptively changing the duty cycle of the synchronous power switch again until the minimum input power is obtained after waiting for a predetermined number of switching cycles; and
  using the duty cycle that corresponds to the minimum input power for the synchronous power switch.

2. The method of claim 1, wherein obtaining the input power comprises sensing the input current and digitizing the sensed input current.

3. The method of claim 1, wherein obtaining the current duty cycle of the synchronous power switch comprises calculating the current duty cycle of the synchronous power switch based at least in part on a switching frequency of a control power switch in the power stage.

4. The method of claim 1, wherein adaptively changing the duty cycle of the synchronous power switch until the minimum input power is obtained further comprises:
  if the power stage operations in DCM, changing the duty cycle of the synchronous power switch in an opposite direction until the minimum input power is obtained.

5. The method of claim 1, wherein adaptively changing the duty cycle of the synchronous power switch until the minimum input power is obtained further comprises:
  if the input power decreases as a result of the increase or decrease of the duty cycle of the synchronous power switch, determining whether the duty cycle of the synchronous power switch is larger than a minimum value; and
  if the duty cycle is not larger than the minimum value, adaptively changing the duty cycle of the synchronous power switch again until the minimum input power is obtained after waiting for a predetermined number of switching cycles.

6. The method of claim 5, wherein adaptively changing the duty cycle of the synchronous power switch until the minimum input power is obtained further comprises:
  if the duty cycle is larger than the minimum value, keeping changing the duty cycle of the synchronous power switch in the same direction as the previous change until the minimum input power is obtained.

7. The method of claim 1, wherein determining whether the power stage operates in a continuous conduction mode ("CCM") or a discontinuous conduction mode ("DCM") comprises determining an operation mode of the power stage based on values of the duty cycle of a control power switch and the duty cycle of the synchronous power switch.

8. The method of claim 1, wherein determining whether the power stage operates in a continuous conduction mode ("CCM") or a discontinuous conduction mode ("DCM") comprises determining an operation mode of the power stage based on an "OR" operation between a control signal for a control power switch and a control signal for the synchronous power switch.

9. The method of claim 1, wherein the power stage comprises a power converter.

10. An apparatus for adaptively controlling a power stage in an electronic system, comprising:
  logic to obtain an input power of the power stage; and
  a controller to adaptively change the duty cycle of the synchronous power switch until the minimum input power is obtained, and to use the duty cycle that corresponds to the minimum input power for the synchronous power switch;
  wherein the controller adaptively changes the duty cycle of the synchronous power switch by:
    increasing or decreasing the duty cycle of the synchronous power switch;
  checking whether the input power decreases as a result of the increase or decrease of the duty cycle of the synchronous power switch;
    if the input power does not decrease as a result of the increase or decrease of the duty cycle of the synchronous power switch, determining whether the power stage operates in a continuous conduction mode ("CCM") or a discontinuous conduction mode ("DCM")
    if the power stage operations in CCM, adaptively changing the duty cycle of the synchronous power switch again until the minimum input power is obtained after waiting for a predetermined number of switching cycles; and
    if the power stage operations in DCM, changing the duty cycle of the synchronous power switch in an opposite direction until the minimum input power is obtained.

11. The apparatus of claim 10, wherein the logic to obtain the input power comprises logic to sense the input current and logic to digitize the sensed input current.

12. The apparatus of claim 10, wherein the controller obtains the current duty cycle of the synchronous power switch by calculating the current duty cycle of the synchronous power switch based at least in part on a switching frequency of a control power switch in the power stage.

13. The apparatus of claim 10, wherein the controller adaptively changes the duty cycle of the synchronous power switch through further operations including:
  if the input power decreases as a result of the increase or decrease of the duty cycle of the synchronous power switch, determining whether the duty cycle of the synchronous power switch is larger than a minimum value;
  if the duty cycle is not larger than the minimum value, adaptively changing the duty cycle of the synchronous power switch again until the minimum input power is obtained after waiting for a predetermined number of switching cycles; and if the duty cycle is larger than the minimum value, keeping changing the duty cycle of the synchronous power switch in the same direction as the previous change until the minimum input power is obtained.

14. The apparatus of claim 10, wherein the controller comprises logic to determine whether the power stage operates in CCM or DCM through an "OR" operation between a control signal for a control power switch and a control signal for the synchronous power switch.

15. The apparatus of claim 10, wherein the power stage comprises a power converter.

16. An article comprising a machine-readable medium that contains instructions, which when executed by a processing platform, cause said processing platform to perform operations for adaptively controlling a power stage in an electronic system, the operations including:

obtaining an input power of the power stage;

obtaining the current duty cycle of a synchronous power switch in the power stage;

adaptively changing the duty cycle of the synchronous power switch until the minimum input power is obtained including:

increasing or decreasing the duty cycle of the synchronous power switch;

checking whether the input power decreases as a result of the increase or decrease of the duty cycle of the synchronous power switch;

if the input power does not decrease as a result of the increase or decrease of the duty cycle of the synchronous power switch, determining whether the power stage operates in a continuous conduction mode ("CCM") or a discontinuous conduction mode ("DCM");

if the power stage operations in CCM, adaptively changing the duty cycle of the synchronous power switch again until the minimum input power is obtained after waiting for a predetermined number of switching cycles; and if the power stage operations in DCM, changing the duty cycle of the synchronous power switch in an opposite direction until the minimum input power is obtained; and using the duty cycle that corresponds to the minimum input power for the synchronous power switch.

17. The article of claim 16, wherein obtaining the input power comprises sensing the input current and digitizing the sensed input current.

18. The article of claim 16, wherein obtaining the current duty cycle of the synchronous power switch comprises calculating the current duty cycle of the synchronous power switch based at least in part on a switching frequency of a control power switch in the power stage.

19. The article of claim 16, wherein adaptively changing the duty cycle of the synchronous power switch until the minimum input power is obtained further comprises:

if the input power decreases as a result of the increase or decrease of the duty cycle of the synchronous power switch, determining whether the duty cycle of the synchronous power switch is larger than a minimum value;

if the duty cycle is not larger than the minimum value, adaptively changing the duty cycle of the synchronous power switch again until the minimum input power is obtained after waiting for a predetermined number of switching cycles; and if the duty cycle is larger than the minimum value, keeping changing the duty cycle of the synchronous power switch in the same direction as the previous change until the minimum input power is obtained.

20. The article of claim 16, wherein determining whether the power stage operates in a CCM or DCM comprises determining an operation mode of the power stage based on values of the duty cycle of a control power switch and the duty cycle of the synchronous power switch.

21. The article of claim 16, wherein determining whether the power stage operates in CCM or DCM comprises determining an operation mode of the power stage based on an "OR" operation between a control signal for a control power switch and a control signal for the synchronous power switch.

* * * * *